(12) United States Patent
Sawicki et al.

(10) Patent No.: US 11,092,256 B2
(45) Date of Patent: Aug. 17, 2021

(54) VENTING PASSAGE FOR A SERVOVALVE

(71) Applicant: Hamilton Sundstrand Corporation, Charlotte, NC (US)

(72) Inventors: Piotr Sawicki, Bogdaniec (PL); Piotr Kozłowski, Mielec (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 170 days.

(21) Appl. No.: 16/059,236

(22) Filed: Aug. 9, 2018

(65) Prior Publication Data
US 2019/0063629 A1 Feb. 28, 2019

(30) Foreign Application Priority Data

Aug. 24, 2017 (EP) .................................. 17461596

(51) Int. Cl.
| | | |
|---|---|---|
| *F16K 21/02* | (2006.01) | |
| *F16K 27/12* | (2006.01) | |
| *F16K 24/02* | (2006.01) | |
| *F16K 17/32* | (2006.01) | |
| *F15B 21/044* | (2019.01) | |
| *F16K 24/04* | (2006.01) | |
| *F16K 31/06* | (2006.01) | |

(52) U.S. Cl.
CPC .............. *F16K 27/12* (2013.01); *F16K 17/32* (2013.01); *F16K 21/02* (2013.01); *F16K 24/02* (2013.01); *F16K 31/06* (2013.01); *F15B 21/044* (2013.01); *F16K 24/04* (2013.01)

(58) Field of Classification Search
CPC .......... F16K 24/02; F16K 24/04; F16K 27/00; F16K 27/0281; F16K 27/029; F16K 27/048; F16K 27/12; F16K 31/06; F16K 47/08

USPC .............................. 137/583; 251/127, 129.15
See application file for complete search history.

(56) References Cited

U.S. PATENT DOCUMENTS

| | | | | |
|---|---|---|---|---|
| 2,063,966 A | | 12/1936 | Whitlock | |
| 3,791,408 A | * | 2/1974 | Saitou | F16K 17/04 137/529 |
| 4,310,123 A | * | 1/1982 | TePastte | F02M 51/0685 239/585.2 |
| 5,050,840 A | * | 9/1991 | Kondo | H01F 7/1607 251/129.08 |
| 6,889,708 B2 | * | 5/2005 | Krimmer | F02M 25/0836 123/510 |
| 6,953,186 B2 | * | 10/2005 | Kaneda | F16K 31/0613 251/129.15 |

(Continued)

FOREIGN PATENT DOCUMENTS

| | | |
|---|---|---|
| DE | 102008012702 A1 | 10/2009 |
| EP | 1128400 A2 | 8/2001 |

OTHER PUBLICATIONS

Extended European Search Report for International Application No. 17461596.3 dated Feb. 15, 2018, 7 pages.

*Primary Examiner* — Seth W. MacKay-Smith
(74) *Attorney, Agent, or Firm* — Cantor Colburn LLP

(57) ABSTRACT

A hydraulic valve is disclosed comprising a venting passage for allowing fluidic communication between an interior and an exterior of the hydraulic valve, the venting passage having a first portion following a first path extending in a first plane, and a second portion following a second path extending in a second plane, wherein the first plane is at an angle to the second plane, and wherein the first and/or second path is a labyrinth path in its respective plane.

11 Claims, 3 Drawing Sheets

(56) References Cited

U.S. PATENT DOCUMENTS

| | | | | |
|---|---|---|---|---|
| 7,175,105 B2 * | 2/2007 | Plecher | F02M 51/005 | 123/498 |
| 7,513,272 B2 * | 4/2009 | Segi | F16K 11/0708 | 137/625.65 |
| 7,784,651 B2 * | 8/2010 | Batschied | B67D 1/1422 | 137/170.1 |
| 8,006,669 B2 * | 8/2011 | Unruh | F02M 51/005 | 123/470 |
| 8,581,683 B2 * | 11/2013 | Hoppe | H01F 7/081 | 251/129.15 |
| 9,016,663 B2 * | 4/2015 | Moreno | F16K 27/029 | 251/129.15 |
| 2002/0182087 A1 * | 12/2002 | Okii | F04B 27/1804 | 417/222.2 |
| 2004/0159812 A1 * | 8/2004 | Kaneda | F16K 31/0613 | 251/129.15 |
| 2006/0038031 A1 * | 2/2006 | Unruh | F02M 51/005 | 239/102.2 |
| 2007/0131281 A1 * | 6/2007 | Manger | F16K 24/04 | 137/487.5 |
| 2008/0128031 A1 * | 6/2008 | Elliott | F16K 27/08 | 137/312 |
| 2011/0284783 A1 * | 11/2011 | Haynes | F16H 61/0251 | 251/129.15 |
| 2012/0199771 A1 * | 8/2012 | Kasagi | F16K 31/0613 | 251/129.15 |
| 2013/0062544 A1 * | 3/2013 | Cheong | F16K 31/0613 | 251/129.15 |
| 2015/0144820 A1 * | 5/2015 | Mills | F16K 31/0613 | 251/129.19 |
| 2016/0033046 A1 * | 2/2016 | Taguchi | F04B 27/1804 | 251/129.15 |
| 2018/0363787 A1 * | 12/2018 | Kubota | F16K 3/085 | |

* cited by examiner

VENTING PASSAGE FOR A SERVOVALVE

FOREIGN PRIORITY

This application claims priority to European Patent Application No. 17461596.3 filed Aug. 24, 2017, the entire contents of which is incorporated herein by reference.

FIELD

The present disclosure relates to venting passages, and servovalves including such venting passages.

BACKGROUND

Venting passages are used, for example in hydraulic valves such as servovalves, to allow condensed water or other liquid, such as that formed by vapour condensation, to exit the valve.

SUMMARY

According to a first aspect, the present disclosure provides a hydraulic valve comprising a venting passage for allowing fluidic communication between an interior and an exterior of the hydraulic valve, the venting passage having a first portion following a first path extending in a first plane, and a second portion following a second path extending in a second plane, wherein the first plane is at an angle to the second plane, and wherein the first and/or second path is a labyrinth path in its respective plane.

The venting passage may allow gas, condensation or other fluid to escape from the interior of the valve. It may also allow any pressure differential between the interior and exterior of the hydraulic valve, such as a pressure differential created by taking the hydraulic valve to altitude, to equalise.

The valve may be a servovalve.

When a hydraulic valve, such as a servovalve, is exposed to a severe environment, such as one having a high level of dustiness, the venting passage may allow contaminants such as sand to enter the interior of the servovalve. The venting passage of the present disclosure extends over two planes and includes at least a portion having a labyrinth path, which may prevent or inhibit contaminants from entering the valve.

The first and/or second portions of the path may be enclosed.

Optionally, the first portion meets the second portion at a location where the first and second planes meet, and the angle is an angle between the first and second planes at said location.

The normal to the first plane is at an angle to the normal to the second plane. The planes being "at an angle" to one another refers to an angle which is not equal to 0° or 180°.

The angle may be from about 60° to about 120°, or from about 80° to about 100°, or about 90°.

The first path extending in the first plane may extend in any direction within the first plane. The first path and the second path may both be labyrinth paths in their respective planes. The, or each, labyrinth path comprises at least one change in angle within the plane. Each respective path thus extends in a first direction and a second direction, wherein the first direction is different to the second direction. The path must therefore bend between the first direction and the second direction, defining the change in angle. The direction of each path corresponds to that of the longitudinal axis of the path (defined when travelling from one end of the path to the other end of the path). The labyrinth path may be a serpentine path having at least one, at least two, at least three, or more than three turns. Each turn may change the path direction by 90°, 180°, from about 10° to about 180°, from about 30° to about 150°, from about 60° to about 120°, or from about 80° to about 100°.

The first and/or second path may be a labyrinth path that longitudinally extends in a first direction, a second direction, and a third direction of the respective path. The first direction may be substantially opposite to the third direction.

The path may extend in the first direction, have a bend, such as a 90° bend, then extend in the second direction, then have another bend, such as a 90° bend in the same direction to complete a 180° total angular change, then extend in the third direction, the third direction being substantially opposite to the first direction. The length of the path extending in the first direction may therefore be parallel to the length of the path extending in the third direction. Both of these lengths of path may be perpendicular to the length of path extending in the second direction. Other bend angles are contemplated, resulting in the length of path extending in the first direction not being parallel to the length of path extending in the third direction. It is also contemplated for the path to have more bends, resulting in first and third directions which may or may not be opposite to one another (i.e. the length of path extending in the first direction may or may not be parallel to the length of path extending in the third direction.

The first and/or second path may comprise a U-shaped portion or a z-shaped portion.

The first and/or second path may include a 180° bend.

The hydraulic valve may comprise a body and a cover covering at least a part of the body, wherein the venting passage is located between and defined by the body and the cover. The venting passage may be partially defined by a channel in the body and/or partially defined by a channel in the cover.

The body may have a housing portion and a base portion, wherein an exterior surface of the housing portion extends in the first plane, and an exterior surface of the base portion extends in the second plane.

The cover may have a housing portion and a flange portion, and an interior surface of the cover housing portion is in the first plane, and an interior surface of the flange portion is in the second plane.

At least one of the first and second planes may be a curved plane. The curved plane may be a cylindrical plane.

At least one of the first and second planes may be a flat plane.

One of the first and second planes may be a curved plane, and the other of the first and second planes may be a flat plane. When one of the first and second planes is a curved plane, and the second of the first and second planes is a flat plane, all lines perpendicular to the curved plane are preferably all at the same angle to a line perpendicular to the flat plane, i.e. the curved plane curves in a direction perpendicular to the flat plane.

The hydraulic valve may be a servovalve.

According to a second aspect, the present disclosure provides a hydraulic valve having a venting passage for allowing fluidic communication between an interior and an exterior of the hydraulic valve, the venting passage having a longitudinal axis following a labyrinth path and that extends in three dimensions.

The longitudinal axis of the labyrinth path may extend in three directions that are orthogonal to one another.

The hydraulic valve of this aspect of the disclosure may include any of the features described in relation to the hydraulic valve of the first aspect of the disclosure.

According to a third aspect, the present disclosure provides a servovalve having a body, a cover covering at least a part of the body, and at least one venting passage, wherein the venting passage is located between and defined by the body and the cover, wherein the cover has a main portion and a flange portion, and wherein the venting passage is partially defined by the main portion and partially defined by the flange portion of the cover.

The servovalve of this aspect of the disclosure may have any of the features described in relation to the first aspect of the disclosure.

BRIEF DESCRIPTION OF DRAWINGS

Various embodiments will now be described, by way of example only, and with reference to the accompanying drawings in which.

DETAILED DESCRIPTION

Figure 1:
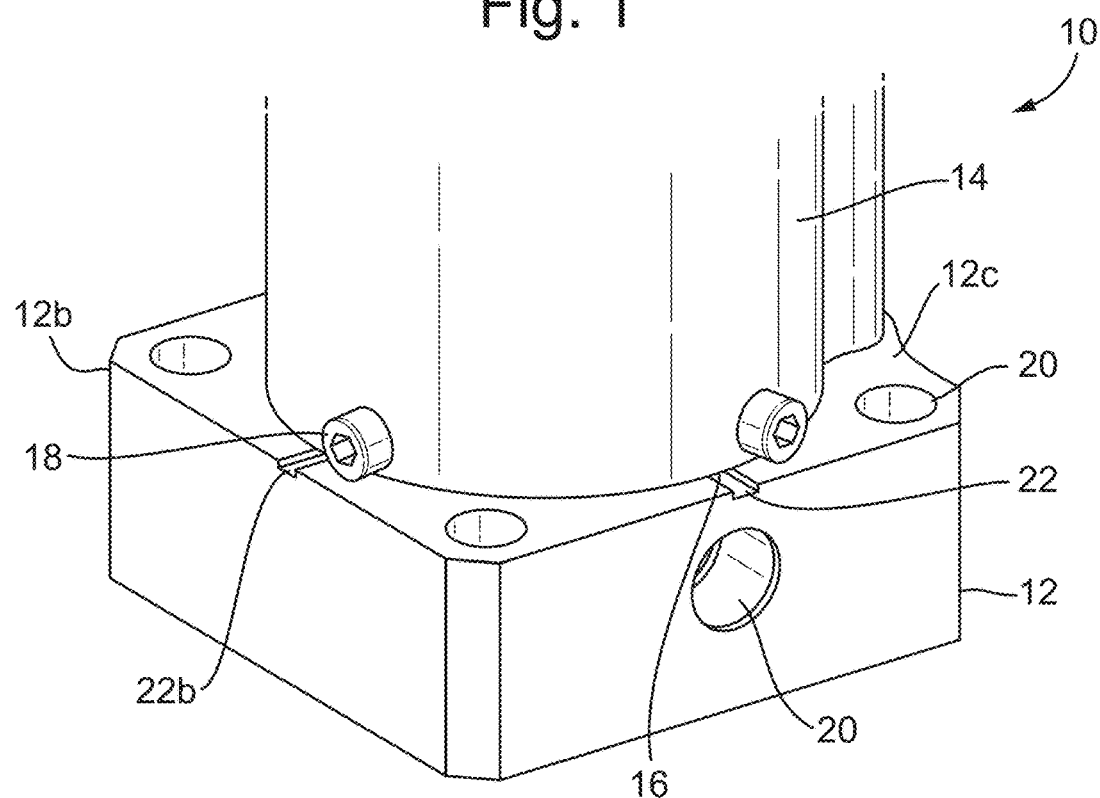
FIG. 1 shows a side view of a portion of a servovalve.
Figure 2:
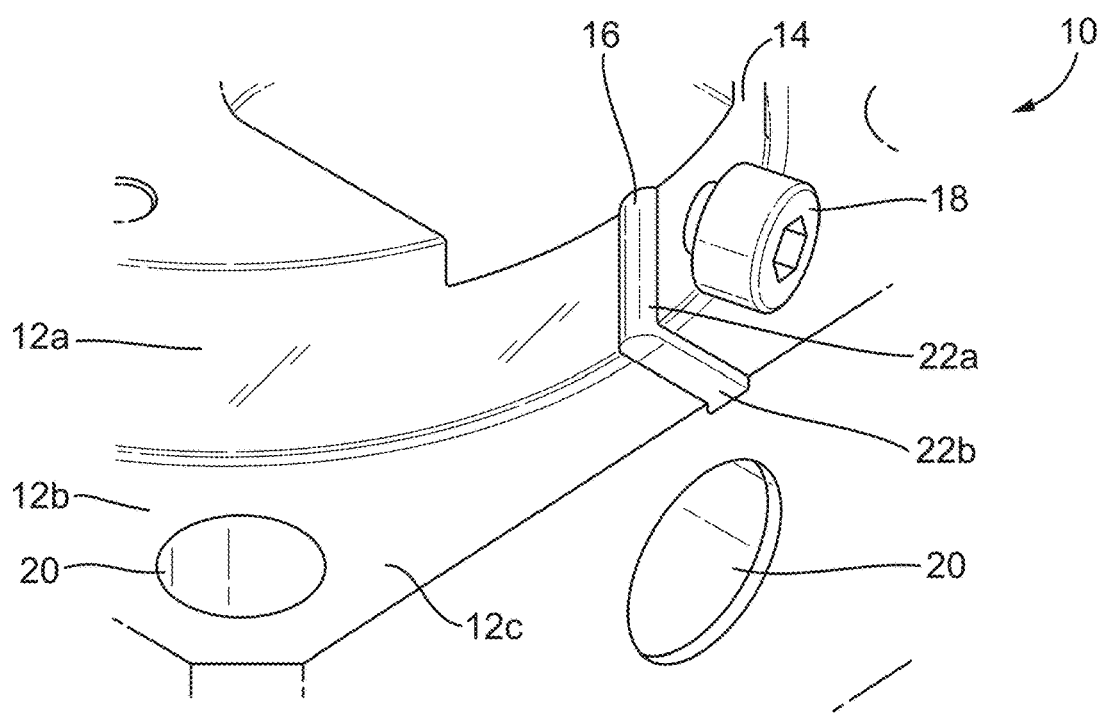
FIG. 2 shows a portion of the servovalve of FIG. 1 with the cover illustrated as translucent.

FIGS. 1 and 2 show an example of a servovalve 10 having a body 12 and a cover 14. FIG. 1 shows a side view of a portion of the servovalve 10. FIG. 2 shows a portion of the servovalve 10 of FIG. 1, except with the cover 14 illustrated as translucent so that the portion of the valve under the cover 14 can be seen.

As can be seen in FIG. 2, an exterior surface of the body 12 includes a generally cylindrical first portion 12a, and a base second portion 12b having a larger cross section than the first portion 12a. The second portion 12b includes a plurality of holes or ports 20. The holes may be used for various purposes, such as for mounting the servovalve to a manifold, or for mounting nozzles or pipes to the servovalve in use. The holes or ports may be plugged after a nozzle or pipe has been mounted thereto.

A channel 22 is formed in the body 12 of the servovalve 10. The channel may be formed by any suitable method, such as by engraving. A first portion 22a of the channel 22 is formed in the first portion 12a of the body 12. A second portion 22b of the channel 22 is formed in the top surface 12c of the second portion 12b of the body 12, i.e. perpendicular to the first portion 22a of the channel 22.

As can be seen in FIGS. 1 and 2, the cover 14 is located to cover the cylindrical portion 12a of the body 12 of the servovalve 10, and is attached to the body 12 using screws or bolts 18. The cover 14 covers and encloses the first portion 22a of the channel, forming a venting passage 16 extending from within the cover 14 to outside of the cover 14. The venting passage 16 thus extends between and is defined by the cover 14 and the body 12. The venting passage 16 extends from the interior of the cover 14 to the exterior of the cover 14 to allow vapour, condensed vapour, water or other liquid to escape from the interior of the cover 14. The cover 14 may cover, for example, a torque motor cavity or may cover another element that changes temperature in use, potentially resulting in condensation within the cover 14.

The present disclosure provides embodiments that are the same as the arrangements described above, except for the structure of the venting passage 16.

Figure 3:
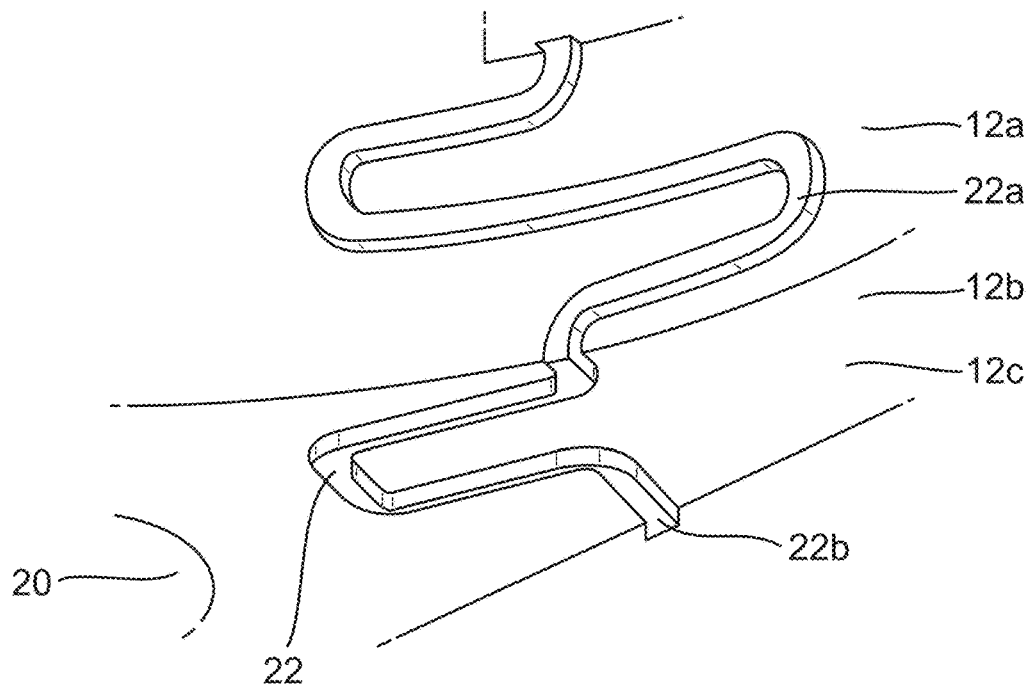
FIG. 3 shows an embodiment of a channel for forming a venting passageway in accordance with the present disclosure.

FIG. 3 shows a portion of a body 12 of a servovalve 10 according to an embodiment of the present disclosure, with the cover 14 removed. A channel 22 may be located in the body 12 of the servovalve 10. The channel 22 may be formed by any suitable method, such as by engraving. The body 12 may comprise a first portion 12a and a second portion 12b. The first portion 12a may be a housing portion 12a. The second portion 12b may be a base portion 12b. The first portion 12a may be generally cylindrical, resulting in a surface thereof forming a curved plane. The second portion 12b may comprise a flat planar top surface 12c. The first and second portions 12a,12b of the body 12 of the servovalve may be integrally formed.

A first portion 22a of the channel 22 may be located in the first portion 12a of the body 12. The first portion 22a of the channel may thus extend in the curved plane of the first portion 12a of the body 12. A second portion 22b of the channel 22 may be located in the second portion 12b of the body 12. The second portion may thus extend in a flat plane. The first and/or second portions 22a,22b of the channel 22 may be recesses in the exterior surface of the body 12, and may have substantially uniform cross-sections. Each said cross-section may have a substantially flat bottom, may have substantially parallel sides perpendicular to the bottom, and may optionally have a curved corner between the bottom and each of the parallel sides. The first and/or second portion 22a,22b of the channel 22 may have a labyrinth path. A labyrinth path is a path which follows a course having at least one bend therein. The labyrinth path of each of the first and/or second portion 22a,22b may have multiple bends therein, e.g. $\geq 2$, $\geq 3$, $\geq 4$, $\geq 5$, $\geq 6$, $\geq 7 \geq 8$, $\geq 9$, or $\geq 10$ bends. Each bend may be a substantially right-angle (e.g. 90°) bend, although other angles are contemplated. By way of example, one or more bends may be provided in the first and/or second portion 22a,22b of the channel 22, e.g. to form one or more 180° turn in the path. The labyrinth path of the first and/or second portion may extend various directions in the portions of the path between the bends. For example, each labyrinth path may extend in a first direction, a second direction, and a third direction, and the first and third directions may be substantially opposite to one another.

The first portion 22a and the second portion 22b of the channel 22 may meet at the junction between the first and second portions 12a,12b of the body 12. At the junction between the first and second portions 12a,12b, the angle between the curved plane of the first portion 12a and the flat plane of the second portion 12b may be substantially a right-angle (e.g. 90°), although other angles are contemplated.

Figure 4:
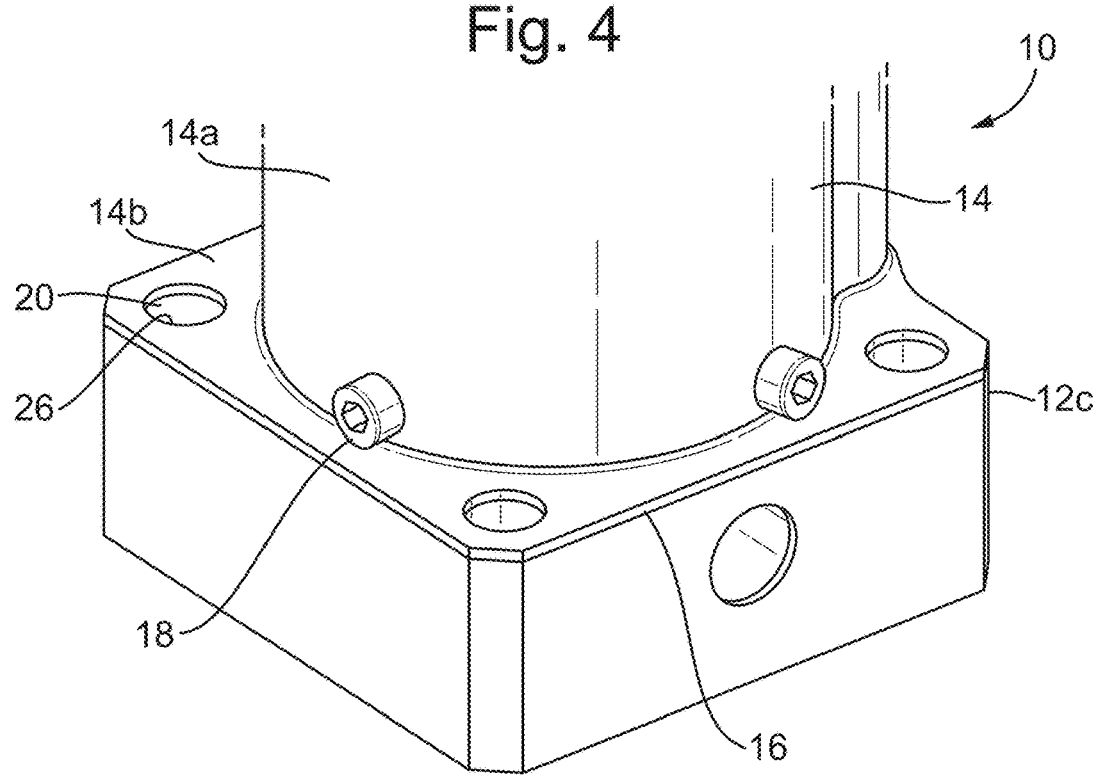
FIG. 4 shows a servovalve including the channel of FIG. 3 and with the cover in place.

FIG. 4 shows the servovalve 10 of FIG. 3, but with the cover 14 over the body 12 so that the channel 22 and cover 14 form a venting passage 16 from the interior to the exterior of the cover 14. The cover 14 may comprise a housing portion 14a and a flange portion 14b. The housing portion 14a may extend over the generally cylindrical first portion 12a of the body 12. The flange portion 14b may extend over the flat top surface 12c of the second portion 12b of the body 12. The cover 14 may thus have a "top hat" shape. The cover 14 may include apertures 26 to allow any ports or holes 20 in the body 12 to remain accessible.

Figure 5:
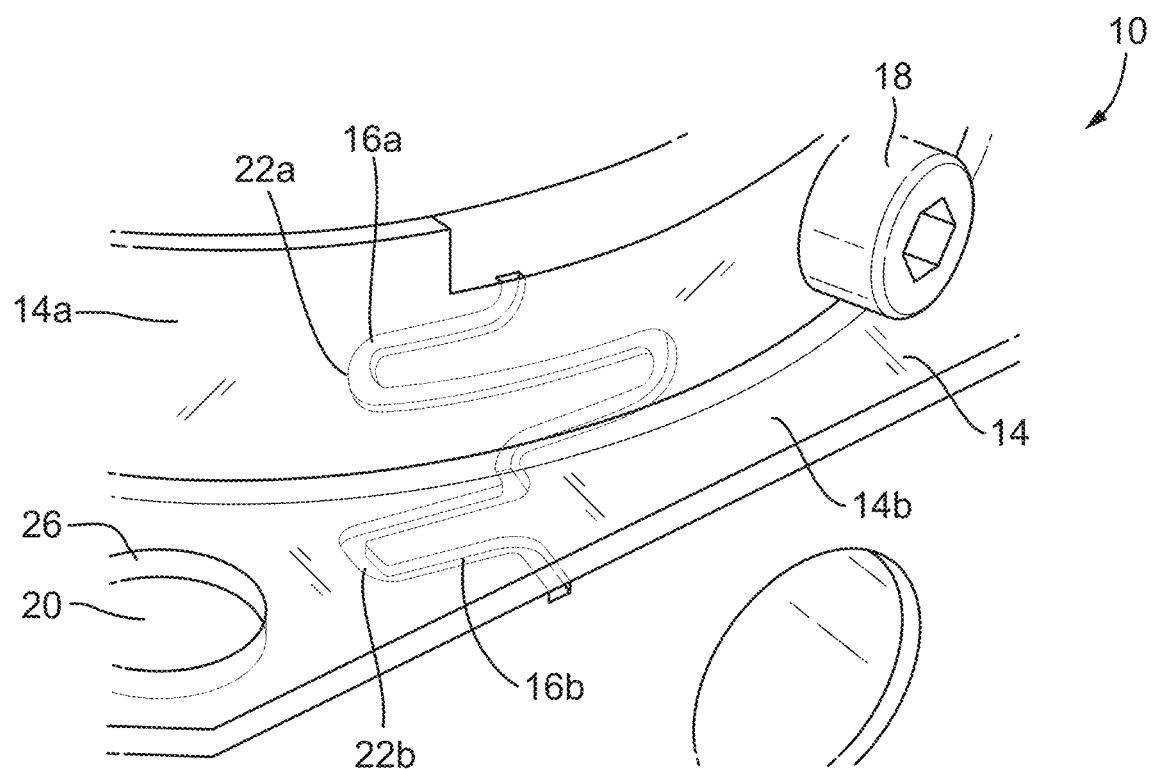
FIG. 5 shows the servovalve of FIG. 4, with the cover illustrated as translucent.

FIG. 5 shows a portion of the embodiment of FIG. 4, but with the cover 14 being translucent (for illustrative purposes only) such that the venting passage 16 may be seen. The venting passage 16 extends from the interior of the cover 14 to the exterior of the cover 14. This may allow gas, vapour, or condensed vapour such as water or other liquid to escape from the interior of the cover 14. The labyrinth path of the venting passage 16 obstructs the passage for sand, dust and other contaminates into the valve. As such, the venting passage 16 helps avoid liquids building up inside the cover 14, without allowing the interior of the cover 14, i.e. the valve, to become contaminated. For example, the cover 14 may cover a torque motor cavity (e.g. the portion 12a of the body may be a motor), or may cover another element that changes temperature in use. The venting passage 16 avoids such temperature changes causing liquid to build up inside the cover 14 due to, for example, condensation.

As can be seen in FIG. 5, the venting passage 16 is defined by the channel 22 in the body 12 and the cover 14 over it. As the cover 14 extends over the first and second portions 12a,12b of the body 12, this results in the venting passage 16 extending in two planes, which may be a curved plane and a flat plane respectively (i.e. the surface planes of the body portions 12a,12b). The planes may be perpendicular to one another. A first portion 16a of the venting passage 16 may extend in the curved plane of the first portion 12a of the body 12, and a second portion 16b of the venting passage may extend in the flat plane of the second portion 12b of the body 12. The first and second portions 16a,16b of the venting passage 16 may meet at a location where the curved plane and the flat plane meet. The angle between the planes at this location may be substantially at a right-angle (e.g. 90°). There may thus be a bend of 90° between the plane in which the first portion 16a and second portion 16b of the venting passage 16 are located.

Although the channel 22 has been described as being formed in the body 12, it may alternatively, or additionally, be formed by recessing the interior surface of the cover 14.

Although the channel 22, and the resultant venting passage 16, have been described as including multiple bends, other shaped paths are contemplated.

Although a servovalve has been described, it is contemplated that the valve may be another type of valve (e.g. hydraulic valve), or another apparatus having a body and a cover.

The invention claimed is:

1. A hydraulic valve comprising a venting passage for allowing fluidic communication between an interior and an exterior of the hydraulic valve, the venting passage having a first length that extends in a first plane, and a second length that extends in a second plane, wherein the first plane is at a non-zero angle to the second plane, and wherein the first and second lengths are labyrinth paths that longitudinally extend in their respective planes;

wherein the first length of the venting passage follows a labyrinth course in the first plane so that the passage extends from a first length first end in a first direction, bends, then extends in a second direction, bends again and then extends in a third direction to a first length second end at a junction;

wherein the second length of the venting passage follows a labyrinth course in the second plane so that the passage extends in a first direction from a second length first end at the junction, bends, then extends in a second direction, bends again and then extends in a third direction to a second length second end, wherein the first length first end and the junction are disposed in an interior of the hydraulic valve and the second length second end is disposed at an exterior of the hydraulic valve.

2. The hydraulic valve of claim 1, wherein the angle is from about 60° to about 90°.

3. The hydraulic valve of claim 1, wherein the first direction of the first length and/or the second length is substantially opposite to the third direction of the respective length.

4. The hydraulic valve of claim 1, wherein the first and/or second length includes a 180° bend.

5. The hydraulic valve of claim 1, comprising a body and a cover covering at least a part of the body, wherein the venting passage is located between and defined by the body and the cover.

6. The hydraulic valve of claim 5, wherein the body has a housing portion and a base portion, wherein an exterior surface of the housing portion extends in the first plane, and an exterior surface of the base portion extends in the second plane.

7. The hydraulic valve of claim 5, wherein the cover has a housing portion and a flange portion, and an interior surface of the cover housing portion is in the first plane, and an interior surface of the flange portion is in the second plane.

8. The hydraulic valve of claim 1, wherein at least one of the first and second planes is a curved plane.

9. The hydraulic valve of claim 1, wherein at least one of the first and second planes is a flat plane.

10. The hydraulic valve of claim 1, wherein the hydraulic valve is a servovalve.

11. The hydraulic valve of claim 1, wherein the first length and second length of the venting passage do not overlap one another.

\* \* \* \* \*